(12) United States Patent
Roemer

(10) Patent No.: US 6,694,313 B1
(45) Date of Patent: Feb. 17, 2004

(54) METHOD FOR COMPRESSION OF A TELEPHONE NUMBER DATABASE IN A TELECOMMUNICATIONS SYSTEM, AND A CORRESPONDING TELECOMMUNICATIONS SYSTEM

(75) Inventor: Wilfried Roemer, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/299,897

(22) Filed: Apr. 27, 1999

(30) Foreign Application Priority Data

Apr. 27, 1998 (DE) .......................................... 198 18 823

(51) Int. Cl.[7] .............................................. G06F 17/30
(52) U.S. Cl. ................... 707/6; 707/4; 707/5; 379/114; 379/219
(58) Field of Search ........................ 707/1–6, 100–101, 707/104; 379/114, 219–221

(56) References Cited

U.S. PATENT DOCUMENTS

| | | | |
|---|---|---|---|
| 4,882,699 A | * 11/1989 | Evensen | 379/284 |
| 5,337,352 A | * 8/1994 | Kobayashi et al. | 379/234 |
| 5,590,188 A | * 12/1996 | Crockett | 379/225 |
| 5,764,733 A | * 6/1998 | Kaminsky et al. | 379/67 |
| 5,917,902 A | * 6/1999 | Saucier | 379/242 |
| 6,169,791 B1 | * 1/2001 | Pokress | 379/114 |

FOREIGN PATENT DOCUMENTS

| | | |
|---|---|---|
| DE | 196 53 624 C1 | 1/1998 |
| EP | 0676 905 A2 | 10/1995 |

OTHER PUBLICATIONS

Leonard Kleinrock et al.: "Hierarchical routing for large networks—Performance evaluation and optimization", Computer Networks No. 1, 1977, pp. 155–174, XP-000775730.

Anthony J. McAuley et al.: "Fast Routing Table Lookup Using CAMs", IEEE INFOCOM '93, The Conference on Computer Communications, Proceedings, vol. 3, Mar. 28, 1993, pp. 1382–1391, XP-000419705.

* cited by examiner

Primary Examiner—James P. Trammell
Assistant Examiner—Mary Wang
(74) Attorney, Agent, or Firm—Laurence A. Greenberg; Werner H. Stemer; Ralph E. Locher

(57) ABSTRACT

A method for the compression of a telephone number database in a telecommunications system. The telephone number database contains a plurality of data records each having a specific dialing pattern, and each dialing pattern has a specific local network code number for a corresponding local network. According to the present invention, superfluous dialing patterns are eliminated or, as far as possible, are combined in a more general and shorter dialing pattern, in order in this way to obtain a compressed telephone number database which requires a smaller amount of memory in the telecommunications system and allows the time required to set up a call to be shortened.

15 Claims, 4 Drawing Sheets

| LWM | BUNUM | Tariff | LRTG | LBER | Comment |
|---|---|---|---|---|---|
| 0 -0- 40X | 1 | City | 1 | 2 | Local Calling Area K1 (AMT) |
| 0 -0- 4522X | 1 | R200 | 3 | 4 | K3 over B1 (AMT) |
| 0 -0- 451X | 1 | R200 | 2 | 4 | K2 over B1 (AMT) |
| 0 -0- 4522X | 3 | City | 3 | 2 | K3 over B3 Direct |
| 0 -0- 451X | 2 | City | 2 | 2 | K2 over B2 Direct |
| 0 -0- 4522X | 2 | City | 3 | 2 | K3 over K2 Direct |
| 0 -0- 451X | 3 | City | 2 | 2 | K2 over K3 Direct |

| LWM | BUNUM | Tariff | LRTG | LBER | Comment |
|---|---|---|---|---|---|
| 0 -0- 40X | 1 | City | 1 | 2 | Local Calling Area K1 (AMT) |
| 0 -0- 4522X | 1 | R200 | 3 | 4 | K3 over B1 (AMT) |
| 0 -0- 451X | 1 | R200 | 2 | 4 | K2 over B1 (AMT) |
| 0 -0- 4522X | 3 | City | 3 | 2 | K3 over B3 Direct |
| 0 -0- 451X | 2 | City | 2 | 2 | K2 over B2 Direct |
| 0 -0- 4522X | 2 | City | 3 | 2 | K3 over K2 Direct |
| 0 -0- 451X | 3 | City | 2 | 2 | K2 over K3 Direct |

FIG 2

```
   ⎧ LDPLN: 0-00-212X, LRTG=1, LBER=9;  /* Morocco
   ⎪ LDPLN: 0-00-213X, LRTG=1, LBER=9;  /* Algeria
   ⎪ LDPLN: 0-00-216X, LRTG=1, LBER=9;  /* Tunisia
 A ⎨ LDPLN: 0-00-218X, LRTG=1, LBER=9;  /* Libya
   ⎪ LDPLN: 0-00-27X,  LRTG=1, LBER=9;  /* South Africa
   ⎪
   ⎩ LDPLN: 0-00-X,    LRTG=1, LBER=9;  /* Rest of the World
```

B { LDPLN: 0-00-X, LRTG=1, LBER=9;  /* Rest of the World

FIG 3A

German Cities:

```
   ⎧ LDPLN: 0-0-38220X, LRTG=1, LBER=2;  /* Wustrow Ostseebad
   ⎪ LDPLN: 0-0-38221X, LRTG=1, LBER=2;  /* Marlow
   ⎪ LDPLN: 0-0-38222X, LRTG=1, LBER=2;  /* Semlow
   ⎪ LDPLN: 0-0-38223X, LRTG=1, LBER=2;  /* Saal Vorpommern
   ⎪ LDPLN: 0-0-38224X, LRTG=1, LBER=2;  /* Gresenhorst
 A ⎨ LDPLN: 0-0-38225X, LRTG=1, LBER=2;  /* Trinwillershagen
   ⎪ LDPLN: 0-0-38226X, LRTG=1, LBER=2;  /* Dierhagen Ostseebad
   ⎪ LDPLN: 0-0-38227X, LRTG=1, LBER=2;  /* Lüdershagen b. Barth
   ⎪ LDPLN: 0-0-38228X, LRTG=1, LBER=2;  /* Dettmannsdorf-Kölzow
   ⎩ LDPLN: 0-0-38229X, LRTG=1, LBER=2;  /* Bad Sülze
```

B { LDPLN: 0-0-3822X, LRTG=1, LBER=2;  /* Wustrow Ostseebad ...

FIG 3B

German Cities:

A {
LDPLN: 0-0-4451X, LRTG=5, LBER=3; /* Varel Jadebusen
LDPLN: 0-0-4452X, LRTG=5, LBER=3; /* Zetel-Neuenburg
LDPLN: 0-0-4453X, LRTG=5, LBER=3; /* Zetel
LDPLN: 0-0-4454X, LRTG=5, LBER=3; /* Jade
LDPLN: 0-0-4455X, LRTG=5, LBER=3; /* Jade-Schweiburg
LDPLN: 0-0-4456X, LRTG=5, LBER=3; /* Varel-Altjührden
LDPLN: 0-0-4458X, LRTG=4, LBER=2; /* Wiefelstede-Spohle LDPLN: 0-0-X, LRTG=1, LBER=5; /* The Rest of Germany

↓

B {
LDPLN: 0-0-4457X, LRTG=1, LBER=5; /* The Rest of Germany
LDPLN: 0-0-4458X, LRTG=4, LBER=2; /* Wiefelstede-Spohle
LDPLN: 0-0-4459X, LRTG=1, LBER=5; /* The Rest of Germany
LDPLN: 0-0-4450X, LRTG=1, LBER=5; /* The Rest of Germany LDPLN: 0-0-445X, LRTG=5, LBER=3; /* Varel Jadebusen ...

LDPLN: 0-0-X, LRTG=1, LBER=5; /* The Rest of Germany

METHOD FOR COMPRESSION OF A TELEPHONE NUMBER DATABASE IN A TELECOMMUNICATIONS SYSTEM, AND A CORRESPONDING TELECOMMUNICATIONS SYSTEM

BACKGROUND OF THE INVENTION

Field of the Invention

The present invention relates to a method for compression of a telephone number database in a telecommunications system, and to a telecommunications system in which this method is used.

In the field of telecommunications, the aim is to set up a communications link as far as possible via the cheapest connecting path. The charges to be paid for a call in this case depend, as a rule, on the distance to the destination subscriber and the time for which the corresponding connecting path is used. In particular, destination-dependent tariff zones may be provided, which are associated with different distances to the destination subscriber being called. For lowest cost routing in telephone systems or telephone networks in countries with such destination-dependent tariff zones, it is thus necessary to store in the respective telephone system the destinations which can be accessed from the respective telephone system, with their destination code numbers, which are called "area codes". Whenever a call is set up, the system controller in the corresponding telephone system searches through the entire set of these destination code numbers in order to make it possible to decide the connecting path via which the call should be routed, for cost reasons.

For reasons linked to utilization of the system controller or of the processors which act as the system controller in the respective telephone system, it is advantageous if the number of stored destination code numbers is kept as small as possible. On the other hand, it is advantageous for least cost routing (LCR) if as great a number of different connecting paths as possible can be considered when determining the connecting path. For which reason, on the other hand, it is necessary to store and control as great a number of local networks and corresponding destination code numbers as possible. In Germany, for example, there are more than 5100 different local networks, with corresponding destination code numbers (area codes) designating the respective local network.

In known telecommunications systems, attempts have already been made to consider, as far as possible, all the available destination code numbers. The range of destination code numbers to be controlled was combined only if a specific maximum number of destination code numbers was specified, for storage reasons in the respective telecommunications system. In this case, the destination code numbers were combined manually which, owing to the wide range of destination code numbers and the possible effects of an incorrect configuration, represented an extensive and time-consuming task. Optimum combination with a minimum number of destination code numbers that nevertheless allowed least cost routing was achieved only rarely. In some cases, such combinations were even deliberately avoided, since this was detrimental to the clarity of the range of telephone numbers and the telephone number database, and costly manual changes would have been required if the area codes were subsequently changed. In Germany, for example, the range of available area codes changes roughly every 6 months.

SUMMARY OF THE INVENTION

It is accordingly an object of the invention to provide a method for compression of a telephone number database in a telecommunications system and a corresponding telecommunications systems that overcome the above-mentioned disadvantages of the prior art methods and devices of this general type, in which case the telephone number database, which contains the dialing patterns with specific destination code numbers (area codes), can be compressed, that is to say minimized, in as simple a manner as possible, with least cost routing determination also being possible. In particular, the method according to the invention is intended to allow the compression of the telephone number database to be automated.

The range of telephone numbers and the telephone number database in a telecommunications system include a plurality of data records, with each data record having a specific dialing pattern. Each dialing pattern or data record can be assigned specific attributes, which can be evaluated in order to control the individual dialing patterns or data records and, in particular, to determine the lowest cost connecting path.

According to a first exemplary embodiment of the present invention, a check is carried out to determine whether the dialing pattern of a first data record is covered by a more general and shorter dialing pattern of a second data record. This is predicated on the more general and shorter dialing pattern having the same attributes as the first-mentioned dialing pattern. If a corresponding more general and shorter dialing pattern has been found, the first-mentioned dialing pattern and the corresponding data record can be deleted.

According to a second exemplary embodiment of the present invention, a check is carried out to determine whether a plurality of dialing patterns are stored which have a matching or identical initial character sequence, that is to say a matching prefix, as well as identical attributes. If this is true, the dialing patterns determined in this way can be combined to form a more general and shorter dialing pattern. That is to say a range of dialing patterns is replaced by a complementary dialing pattern that simultaneously covers all the dialing patterns in the previously quoted range.

According to a third exemplary embodiment of the present invention, general dialing patterns which are in principle superfluous, since all the more specific dialing patterns which are covered by the general dialing pattern have already been separately identified, are deleted and eliminated.

The methods proposed according to the present invention for compression of the range of telephone numbers in telecommunications systems allow the process of minimizing the destination code numbers (area codes) to be automated. The compression method according to the present invention is preferably always carried out whenever the telecommunications system is being configured and is being prepared for use. The application of the present invention ensures that the number of destination code numbers and corresponding data records which can be used for least cost routing is always a minimum, so that the memory required for these data records in the respective telecommunications system can likewise be minimized. The minimum number of destination code numbers and data records to be controlled also results in a reduction in the time required to set up a call. The telephone number database can be configured quickly, reliably and correctly and, in particular, changes and adaptations to the telephone number database can be carried out without any problems owing to the small amount of effort involved.

In practice, the methods proposed according to the present invention can be combined with one another, that is to say carried out successively, with the individual methods being used, in particular, repeatedly until no further minimizing or compression of the telephone number database can be achieved.

With the foregoing and other objects in view there is provided, in accordance with the invention, a telecommunications system, including: a memory for storing a telephone number database having a plurality of data records each with a specific dialing pattern, the specific dialing pattern having a specific destination code number of a telecommunications network and assigned at least one specific attribute for controlling the specific dialing pattern; and a compression device for compression of the telephone number database stored in the memory and for performing the methods steps of the first embodiment, the second embodiment, the third embodiment or a combination of any or all of the embodiments.

Other features which are considered as characteristic for the invention are set forth in the appended claims.

Although the invention is illustrated and described herein as embodied in a method for compression of a telephone number database in a telecommunications system, and a corresponding telecommunications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1a is a diagrammatic, illustration of an example of a configuration of a telephone network having three network nodes;

FIG. 1b is a chart of an example of a database within a network node shown in FIG. 1a, in order to describe individual destination directions of the telephone network shown in FIG. 1a;

FIG. 2 is an illustration to explain a first exemplary embodiment of a database compression method according to the invention;

FIG. 3a is an illustration explaining a first variant of a second exemplary embodiment of the database compression method;

FIG. 3b is an illustration explaining a second variant of the second exemplary embodiment.

DESCRIPTION OF THE PREFERRED EMBODIMENTS

Figures 1A, 1B:
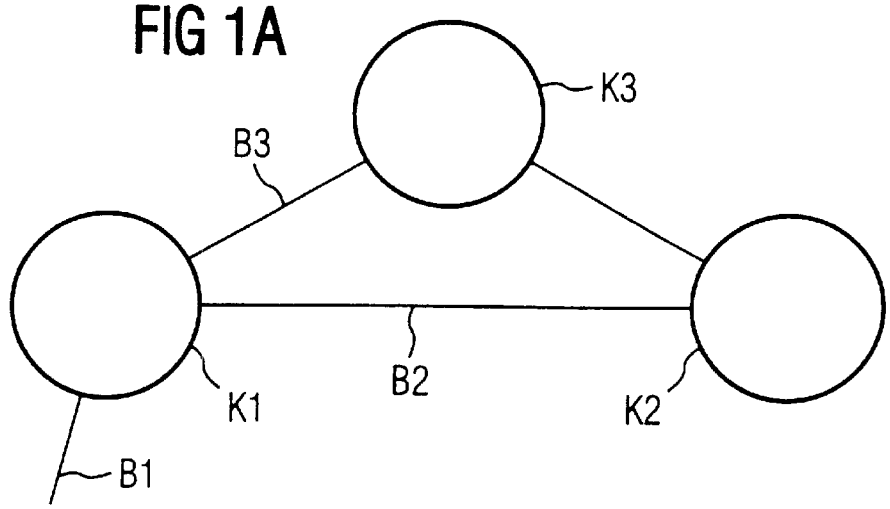

In all the figures of the drawing, sub-features and integral parts that correspond to one another bear the same reference symbol in each case. Referring now to the figures of the drawings in detail and first, particularly, to FIGS. 1a and 1b thereof, to explain the problems of least cost routing (LCR). FIG. 1a shows an example of a telephone network having network nodes K1–K3, in which case it is subsequently assumed that the intention is to configure a telephone system in the network node K1. The network node K1 is connected via a first trunk line B1 to a public network, that is to say a central office line. Furthermore, originating from the network node K1, there is a direct cross-link B2 to the network node K2 and a direct cross-link B3 to the network node K3. In addition, it is assumed that the two network nodes K2 and K3 are likewise connected to one another via a direct cross-link.

When a call request arrives at the network node K1, it is now necessary for the corresponding telephone system to determine the least cost connecting path to the destination subscriber being called. In this case, as a rule, there is a tendency as far as possible to make central office calls in one's own network, that is to say in the present example, via the direct cross-link lines B2 and B3, and to route the call via the public network only in the vicinity of the respective destination location. Thus, in the optimum case, long-distance calls can be made for the cost of a local call.

For such least cost routing to be possible, the configuration of the respective network, that is to say the connecting paths which are possible to the respective destination locations, must first be configured in the network node K1. This is done, in particular, using the destination code numbers or area codes which are characteristic of the various destination locations.

FIG. 1b shows a simplified minimum telephone number plan for the network configuration shown in FIG. 1a. In this case, it is assumed that the node K1 is in the local network having the area code "0-40", the node K2 is in the local network having the area code "0-451" and the node K3 is in the local network having the area code "0-4522". Thus, for example, if a subscriber to the network node K1 wishes to call a subscriber to the network node K2 he must, possibly after previously dialing a central office code number (in the present case a "0"), in order to allow access to the lines B1–B3, dial the area code "0451" and then the telephone number assigned to the respective terminal. Since only the individual destination code numbers or area codes are of interest for the purposes of the present invention, an "X" is used as a spacekeeper, by which all the destination telephone numbers corresponding to the dialed area codes are covered.

According to FIG. 1b, separate data records for the individual destination directions, originating from the network node K1, in the network shown in FIG. 1a are stored in the telephone system of the network node K1. Each connecting path and each destination direction are described by a corresponding LCR dialing pattern LWM. Furthermore, the number of the corresponding trunk group, the tariff to be paid as well as two attributes LRTG and LBER are stored for each connecting path. The attribute LRTG describes the LCR transmission direction of the corresponding connecting path in the telecommunications sense. The attribute LBER corresponds to the LCR access authorization, in which case a subscriber having a specific LBER value can use only those connecting paths that have the same LBER value.

According to FIG. 1b, a subscriber can access the public network via the line group B1 from the node K1 by dialing an initial "0" (as the central office code number) as well as the area code "040" in which case the so-called city tariff has to be paid. This connecting path is assigned the LRTG value=1 as well as the LBER value=2. Furthermore, according to FIG. 1a, there are three links to the network node K2, which are each taken into account by dialing the area code "0451" (followed by the destination telephone number of the subscriber being called) when selecting the least cost connecting path. Starting from the network node K1, the first connecting path passes via the public network (central office), that is to say via the trunk group B1, in which case charges must be paid for the so-called Region 200 tariff (R200). The second connecting path starts from the network node K1 and passes via the direct cross-link B2 to the network node K2, in which case only the city tariff must be paid. Finally, the third connecting path runs via the direct cross-linking line B3 and the network node K3, in which case the city tariff must once again be paid. All the connecting paths to the network node K2 have the LRTG value "2". In an analogous manner, there are three different connecting paths starting from the network node K1 to the network node K3, the individual parameters for which can be seen in FIG. 1b.

Since the connecting paths which run via the trunk group B1 and the public network to the network nodes K2 and K3 are relatively expensive, only certain subscribers should be able to access these connecting paths. That is to say only subscribers having LBER=4 may use those connecting paths to the network nodes K2 and K3 which run via the trunk group B1 and the public network. All other connecting paths are assigned the LBER value=2, so that any subscriber having LBER=2 may use these connecting paths.

When a call request arrives in the network node K1, the telecommunications system now uses the data shown in FIG. 1b to determine the least cost connecting path to the desired destination subscriber.

On the basis of the above description, it becomes clear that a very large database in the respective telecommunications system has to be controlled if there are a large number of different area codes and local networks as well as corresponding dialing patterns. The present invention therefore proposes automatic compression methods using the telephone number database and the range of telephone numbers to be controlled can be minimized, with effective least cost routing (LCR) being ensured as well. This is worthwhile, particularly for those telecommunications systems that can control and store only a limited number of different dialing patterns.

Various exemplary embodiments of the present invention will be explained in the following text with reference to FIGS. 2 to 4, and the methods described are each carried out automatically, with computer assistance, in the respective telecommunications system or telephone system. In this case, the computer facilities used in the respective telephone system preferably assist, all the methods described in the following text, so that the individual methods can be carried out successively until no more minimization or compression is possible.

For the explanation of the various exemplary embodiments of the present invention, it is assumed in the following text that the individual dialing patterns have been entered in the respective data record completely, including the office code and, possibly, with any additionally required separating characters for the integrated services digital network central office connection.

The upper part of FIG. 2 shows a simplified initial telephone number plan (least cost routing dial plan, LDPLN) having a plurality of LDPLN entries or LDPLN data records. Each data record includes a specific dialing pattern having corresponding attributes, in which case it is assumed in the following examples that the previously explained parameters LRTG and LBER are used as attributes. Each data record is followed, separated by an "/*", by brief comments relating to the respective data record or dialing pattern. Thus, for example, the dialing pattern stored in the first line is necessary to allow an area code in Morocco to be dialed.

Furthermore, the data region A includes a general dialing pattern "0-00-X", which is shown in the last line and, according to the present example, is intended for all the remaining local networks throughout the world. As has already been mentioned above, the character "X" is used as a spacekeeper and thus covers any required subsequent character or character sequence.

The first exemplary embodiment of the present invention provides for the existing number of dialing patterns to be reduced by checking whether there are any dialing patterns which are covered by a more general dialing pattern that likewise exists. In particular, a check is carried out to determine whether the dialing patterns in question have an identical initial character sequence or an identical prefix and identical attributes to the more general dialing pattern. In the present case, the general dialing pattern "0-00-X" which is shown in the last line of data region A includes an initial character sequence which is included in identical form in all the other dialing patterns. Furthermore, the LRTG and LBER attributes correspond to the respective attributes of the other dialing patterns so that, according to FIG. 2, all the specific dialing patterns for the individual countries can be deleted without being replaced, since they are already covered by the general dialing pattern "0-00-X". As has already been mentioned, this method is predicated on the attributes or parameters LRTG and LBER matching between the specific dialing patterns and the general dialing pattern since, if this is not the case, the individual dialing patterns cannot be combined. Thus, according to FIG. 2, the data region A shown in the upper part of FIG. 2 is used to produce the compressed data region B which is shown in the lower part of FIG. 2 and, according to the present example, now includes only a single data record, with the general dialing pattern "0-00-X".

FIGS. 3a and 3b show illustrations to explain a second exemplary embodiment of the present invention. According to the second exemplary embodiment, a check is carried out to determine whether there are any data records which have identical attributes and can be replaced by a more general new dialing pattern. The more general dialing pattern then includes only the matching prefix of the first-mentioned dialing pattern, followed by the spacekeeper "X".

According to FIG. 3a, the initial database in the telephone system has a plurality of LDPLN entries, each of which includes a specific dialing pattern, and with each dialing pattern being assigned the same LCR authorization (LBER) and the same LCR direction (LRTG). Since all the dialing patterns and the corresponding area codes have the same prefix "0-0-3822", these dialing patterns can be replaced by the more general dialing pattern "0-0-3822X".

The more general dialing pattern is assigned the same attribute values as those dialing patterns that have been combined. Thus, according to the example shown in FIG. 3a, the ten entries in the initial data record A are converted into a single entry B, corresponding to a saving of 90%.

In general, dialing patterns can effectively be saved if six or more dialing patterns have the same prefix, that is to say the same initial character sequence and the same attributes. FIG. 3b shows an appropriate example, in which the first six LDPLN entries in the initial data region A can be replaced by the general dialing pattern "0-0-445X" with the attributes LRTG=5 and LBER=3. This more general dialing pattern would, however, also cover the dialing patterns "0-0-4457X", "0-0-4459X" and "0-0-4450X" which have, however, not yet been defined separately in the data record A. In consequence, when the more general dialing pattern "0-0-445X" is produced for the previously quoted but not yet defined dialing patterns which are also covered by the new more general dialing pattern, separate LDPLN entries are created which, however, are assigned the attributes of the very general dialing pattern "0-0-X", which likewise already exist, and accordingly have the values LRTG=1 and LBER= 5. Dialing patterns which have attribute values other than those of the other combined dialing patterns despite having an identical initial character sequence to the newly generated general dialing pattern "0-0-445X" are retained unchanged. In the example shown in FIG. 3b, this relates in particular to the dialing pattern "0-0-4458X".

The reduced data record B shown in FIG. 3b is obtained in this way and, instead of the original seven dialing patterns, now contains only five data records having corresponding dialing patterns, corresponding to a saving of virtually 30%.

In the exemplary embodiment shown in FIG. 3b, it has been assumed that, when a very general dialing pattern (the dialing pattern "0-0-X" in FIG. 3b) exists, those dialing patterns which have not yet had a separate data record assigned to them but which are covered by the newly generated general dialing pattern ("0-0-445X" in FIG. 3b) are assigned new data records having the attributes of an already existing, very general dialing pattern ("0-0-X" in FIG. 3b). However, instead of this, it is also possible to provide as standard for these dialing patterns to be dealt with the same prefix as the other dialing patterns during the optimization or compression process, even though they had originally not been entered, so that no separate data records having different attributes are produced for such dialing patterns, and these dialing patterns are likewise covered by the newly generated general dialing pattern ("0-0-445X" in FIG. 3b) having the corresponding attributes.

Figure 4:
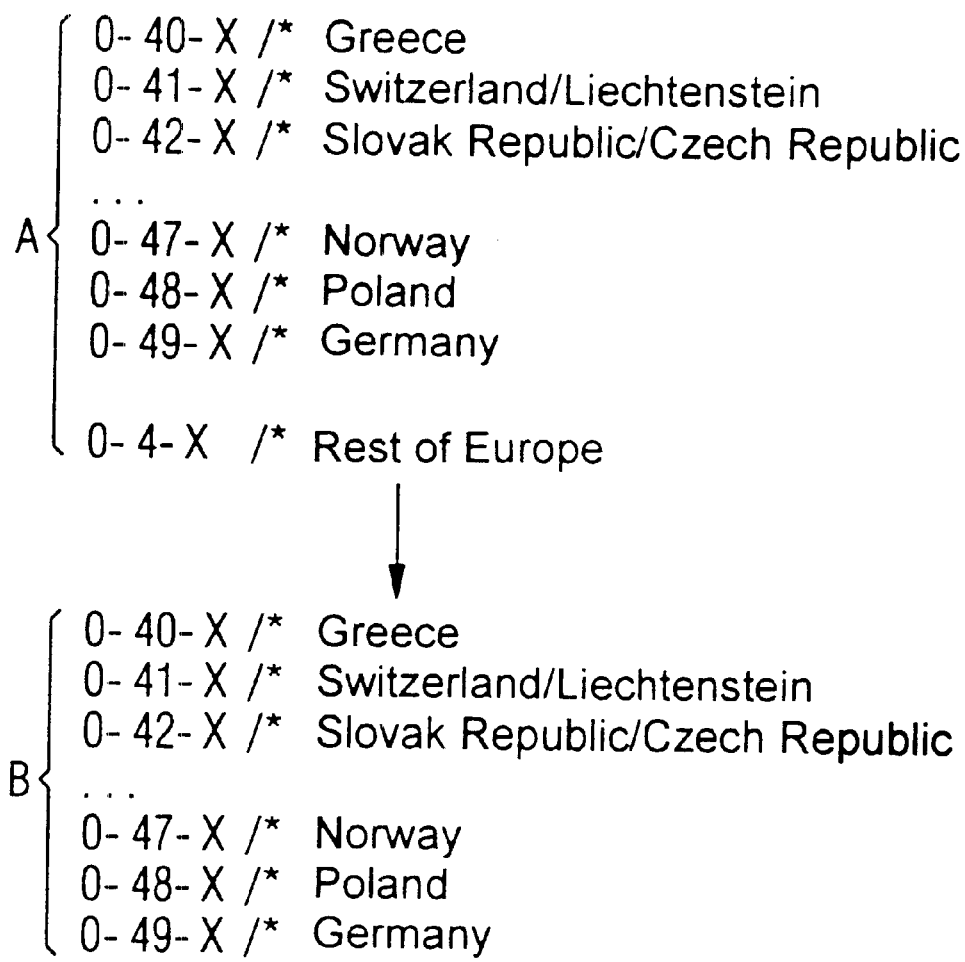
FIG. 4 is an illustration explaining a third exemplary embodiment of the database compression method.

FIG. 4 shows a third exemplary embodiment of the present invention.

According to the third exemplary embodiment, a check is carried out to determine whether a general dialing pattern exists which covers a plurality of specific dialing patterns which have, however, each already been taken into account by separate data records. In this way, unnecessary general dialing patterns can be deleted and eliminated.

According to FIG. 4, the initial data record A contains, for example, ten dialing patterns "0-40-X" to "0-49-X" to which different local networks in Europe are assigned. Furthermore, a general dialing pattern "0-4-X" is assumed to have been stored, this being intended for the rest of Europe. However, irrespective of the configuration of this dialing pattern, that is to say irrespective of the corresponding attributes of the data record, this general dialing pattern "0-4-X" is unnecessary since separate and specific data entries exist for all the options which are covered by the corresponding general dialing pattern "0-4-X". In consequence, this general dialing pattern "0-4-X" can never be taken into account in the least cost routing, so that this entry can be deleted and, according to the third exemplary embodiment, the reduced data set B shown in the lower part of FIG. 4 is obtained.

A superfluous configuration which corresponds to the data record A in FIG. 4 is actually carried out very rarely by the user. Such configurations can, however, arise after carrying out the compression methods shown in FIGS. 2 and 3, so that it is particularly advantageous to carry out the compression method shown in FIG. 4 following the compression methods shown in FIGS. 2 and 3.

In each of the previous exemplary embodiments, it has been assumed that the individual dialing patterns are minimized down to their last (seen from the rear) separating slash. This is intended to prevent the individual dialing patterns from being corrupted and for it no longer to be possible to interpret them using the dialing rule which is assigned to the respective dialing patterns and defines the implementation of the dialing pattern for the central office line. In consequence, when an "X" is entered, the dialing patterns are not ended with an "−X". On the other hand, it is possible to use an "−X" termination to inhibit minimization or compression of the respective dialing pattern, so that the user can allow or inhibit compression specifically on the basis of the dialing patterns.

In addition, it should be mentioned that, for reasons associated with making the respective telecommunications system user-friendly, an attempt has been made to provide a respectively appropriate commentary for compression of dialing patterns as well. If a plurality of dialing patterns are being replaced by an already existing more general dialing pattern, the comments for the more general dialing pattern are retained (see FIG. 2). If, in contrast, a plurality of dialing patterns are combined and are replaced by a new more general dialing pattern, the comments for the dialing pattern having the (numerically) smallest prefix are used for the new more general dialing pattern, and are annotated by following this by ". . ." (see FIGS. 3a and 3b). If, during the procedure, new data records are produced (by lengthening an already existing short general dialing pattern) for dialing patterns which are also covered by the newly generated general dialing pattern but have not yet been defined, the comments for the already existing short general dialing pattern are also used for the newly generated lengthened dialing pattern (see FIG. 3b "Rest of Germany" with respect to the generated dialing patterns "0-0-4457X", "0-0-4459X" and "0-0-4450X").

I claim:

1. An improved method for compression of a telephone number database in a telecommunications system, the telephone number database having a plurality of data records each having a specific dialing pattern, the specific dialing pattern having a specific destination code number for a telecommunications network and assigned at least one specific attribute for controlling the specific dialing pattern in the telecommunications system, the improvement which comprises:

a) searching the plurality of data records for the data records in the telephone number database having dialing patterns with identical initial character sequences and identical attributes;

b) combining the data records found in step a) to form a data record having a more general dialing pattern than the data records found in step a), the more general dialing pattern having an initial character sequence identical to the initial character sequence of the dialing patterns of the data records found in step a), and the more general dialing pattern being assigned attributes identical to the attributes of the dialing patterns of the data records found in step a); and c) maintaining the data records having dialing patterns with an identical initial character sequence matching the dialing patterns of the data records found in step a) but not having the same assigned attributes, unchanged.

2. The method according to claim 1, which further comprises:

producing in step b) a new data record having the more general dialing pattern; and deleting the data records found in step a).

3. The method according to claim 1, which further comprises providing the more general dialing pattern having the identical initial character sequence with a spacekeeper for mutually different end characters of the dialing patterns of the data records found in step a).

4. The method according to claim 1, which further comprises forming in each case a new data record for the dialing patterns having identical initial character sequences matching the more general dialing pattern but having not yet been taken into account in an existing data record, and assigning the new data record attributes of an already existing data record from a further more general dialing pattern.

5. The method according to claim 1, which further comprises producing no new data record for the dialing patterns having the identical initial character sequence matching the more general dialing pattern but having not yet been taken into account in an existing data record since the dialing patterns are also covered by the more general dialing pattern produced in step b).

6. The method according to claim 1, wherein the attributes assigned to each of the dialing patterns have a transmission direction to a destination node corresponding to a respective dialing pattern via the telecommunications network connected to the telecommunications system, and an access authorization for use of a connection leading to the destination node corresponding to the respective dialing pattern.

7. The method according to claim 1, which further comprises using the attributes assigned to the dialing patterns in the telecommunications system for determining a least-cost call origination to a destination node corresponding to a respective dialing pattern in the telecommunications network to which the telecommunications system is connected.

8. The method according to claim 1, which further comprises providing each data record and a corresponding dialing pattern for a possible connection between the telecommunications system with a destination node corresponding to a respective dialing pattern in the telecommunications network to which the telecommunications system is connected.

9. The method according to claim 8, wherein the destination code number contained in the specific dialing pattern corresponds to a local network having a respective destination node in the telecommunications network.

10. The method according to claim 1, which further comprises:
   d) checking if there is a data record having a first dialing pattern covering a plurality of more specific second dialing patterns, the second dialing patterns each having separate data records covered by the first dialing pattern; and
   e) deleting the data record of the first dialing pattern if the result of the check carried out in step d) is positive.

11. The method according to claim 10, which further comprises: assigning each dialing pattern specific attributes for controlling the dialing patterns in the telecommunications system; and carrying out step e) irrespective of the attributes assigned to the first dialing pattern, if the result of the check carried out in step d) is positive.

12. The method according to claim 1, which further comprises:
   d) repeating steps a)–c) until the telephone number database cannot be compressed any further.

13. A telecommunications system, comprising:
   a memory for storing a telephone number database having a plurality of data records each with a specific dialing pattern, the specific dialing pattern having a specific destination code number of a telecommunications network and assigned at least one specific attribute for controlling the specific dialing pattern; and
   a compression device for compression of the telephone number database stored in said memory and for performing the following steps:
      a) searching the plurality of data records for the data records in the telephone number database having dialing patterns with identical initial character sequences and identical attributes;
      b) combining the data records found in step a) to form a data record having a more general dialing pattern than the data records found in step a), the more general dialing pattern having an initial character sequence identical to the initial character sequence of the dialing patterns of the data records found in step a), and the more general dialing pattern assigned attributes identical to the attributes of the dialing patterns of the data records found in step a); and
      c) maintaining the data records having dialing patterns with an identical initial character sequence matching the dialing patterns of the data records found in step a) but not having the same assigned attributes, unchanged.

14. The telecommunications system according to claim 13, which further comprises:
   d) checking if there is a data record having a first dialing pattern covering a plurality of more specific second dialing patterns, the second dialing patterns each having separate data records covered by the first dialing pattern; and
   e) deleting the data record of the first dialing pattern if the result of the check carried out in step a) is positive.

15. The telecommunications system according to claim 13, wherein said compression device has a computer for computer-aided compression of the telephone number database.

* * * * *